United States Patent
Ahn et al.

(10) Patent No.: US 10,480,747 B2
(45) Date of Patent: Nov. 19, 2019

(54) REAR LAMP APPARATUS OF VEHICLE

(71) Applicants: Hyundai Motor Company, Seoul (KR); Kia Motors Corporation, Seoul (KR); SL Corporation, Daegu (KR)

(72) Inventors: Byoung Suk Ahn, Gyeonggi-do (KR); Jik Soo Shin, Incheon (KR); Jung Wook Lim, Seoul (KR); Ki Hong Lee, Seoul (KR); Sung Wook Yoon, Gyeongsangbuk-do (KR); Ji Yeon Kim, Gyeongsangbuk-do (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 74 days.

(21) Appl. No.: 15/831,080

(22) Filed: Dec. 4, 2017

(65) Prior Publication Data

US 2019/0113203 A1    Apr. 18, 2019

(30) Foreign Application Priority Data

Oct. 12, 2017    (KR) .................. 10-2017-0132107

(51) Int. Cl.
*F21S 43/31*    (2018.01)
*F21S 43/50*    (2018.01)
(Continued)

(52) U.S. Cl.
CPC .............. *F21S 43/50* (2018.01); *B60Q 1/26* (2013.01); *F21S 43/26* (2018.01); *F21S 43/31* (2018.01);
(Continued)

(58) Field of Classification Search
CPC . F21S 43/50; F21S 43/31; F21S 43/26; B60Q 1/26; B60Q 2400/50; G03H 1/00;
(Continued)

(56) References Cited

U.S. PATENT DOCUMENTS 5,101,193 A * 3/1992 Smith ................... B60Q 1/302
340/468
5,130,900 A * 7/1992 Makita ................. F21S 41/164
362/517

(Continued)

FOREIGN PATENT DOCUMENTS

| JP | H08282369 A | 10/1996 |
| KR | 2000-0000644 A | 1/2000 |
| KR | 20160057731 A | 5/2016 |

*Primary Examiner* — William R Alexander
(74) *Attorney, Agent, or Firm* — Mintz Levin Cohn Ferris Glovsky and Popeo, P.C.; Peter F. Corless

(57) ABSTRACT

A rear lamp apparatus of a vehicle is provided. The rear lamp apparatus includes a light source configured to irradiate beams, a hologram lens configured to generate a specific image when the beams irradiated from the light source are incident thereto and a reflector disposed to position the beams of the light source incident thereto and reflect the beams irradiated from the light source to transmit the beams to the hologram lens. A shield is disposed between the light source and the hologram lens to block the beams irradiated from the light source to prevent the beams from being incident to the hologram lens. Accordingly, the rear lamp apparatus resolves distortion when a hologram image is formed and is advantageous in a layout by reducing a reproduction distance when a recording distance of the hologram image is increased.

12 Claims, 7 Drawing Sheets

(51) Int. Cl.
*F21S 43/20* (2018.01)
*B60Q 1/26* (2006.01)
*G03H 1/00* (2006.01)
*G03H 1/22* (2006.01)

(52) U.S. Cl.
CPC ......... *G03H 1/0005* (2013.01); *G03H 1/2202* (2013.01); *G03H 1/2286* (2013.01); *B60Q 2400/50* (2013.01); *G03H 2223/12* (2013.01); *G03H 2223/24* (2013.01); *G03H 2227/06* (2013.01)

(58) Field of Classification Search
CPC .. G03H 1/0005; G03H 1/2202; G03H 1/2286; G03H 2223/12
USPC .......................................................... 359/16
See application file for complete search history.

(56) References Cited

U.S. PATENT DOCUMENTS

| | | | | |
|---|---|---|---|---|
| 5,195,815 A * | 3/1993 | Watanabe | ............... | F21S 41/00 362/510 |
| 5,455,692 A * | 10/1995 | Wreede | .................. | B60Q 1/302 359/13 |
| 5,488,493 A * | 1/1996 | Moss | ..................... | B60Q 1/302 359/13 |
| 5,495,227 A * | 2/1996 | Wreede | .................. | B60Q 1/302 340/479 |
| 5,497,251 A * | 3/1996 | Wreede | .................. | B60Q 1/302 359/13 |
| 5,774,241 A * | 6/1998 | Smith | ..................... | B60Q 1/302 359/15 |
| 6,203,177 B1 * | 3/2001 | Watanabe | ............... | F21S 41/47 362/351 |
| 7,008,098 B2 * | 3/2006 | Yamaguchi | ........... | F21S 41/196 362/547 |
| 7,150,553 B2 * | 12/2006 | English | ................ | B60Q 1/2696 362/545 |
| 7,431,486 B2 * | 10/2008 | Bloemen | .............. | B60Q 1/0052 362/540 |
| 2002/0075695 A1 * | 6/2002 | Fujinami | ............. | B60Q 1/0041 362/517 |
| 2003/0063476 A1 * | 4/2003 | English | ................ | B60Q 1/2696 362/545 |
| 2004/0202005 A1 * | 10/2004 | Moisel | .................. | F21V 29/004 362/538 |
| 2008/0247182 A1 * | 10/2008 | Yasuda | .................. | B60Q 1/076 362/465 |
| 2012/0008335 A1 * | 1/2012 | Yamamoto | ............ | F21S 41/147 362/539 |
| 2017/0153000 A1 * | 6/2017 | Sato | ........................ | F21S 41/00 |
| 2017/0276843 A1 * | 9/2017 | Hohmann | ............... | F21S 43/00 |
| 2018/0180241 A1 * | 6/2018 | Huber | ..................... | F21S 41/25 |

\* cited by examiner

REAR LAMP APPARATUS OF VEHICLE

CROSS REFERENCE TO RELATED APPLICATION

The present application claims priority to Korean Patent Application No. 10-2017-0132107, filed Oct. 12, 2017, the entire contents of which is incorporated herein for all purposes by this reference.

BACKGROUND

1. Technical Field of the Disclosure

The present disclosure relates to a rear lamp apparatus of a vehicle, and more particularly, to a rear lamp apparatus of a vehicle for removing a distortion phenomenon when forming a hologram image.

2. Description of the Related Art

Typically, a front surface of a vehicle is provided with a front lamp (e.g., a head lamp) for illuminating a road in front of the vehicle during low light conditions, and a rear surface of the vehicle is provided with a back lamp (e.g., a rear lamp) turned on when shifting into a reverse gear, a brake lamp turned on when engaging a brake pedal, and the like. Therefore, it is possible to prevent occurrence of an accident by allowing a driver of the following vehicle to recognize a change in a driving situation of the subject vehicle (e.g., turning or a stop of the vehicle).

The rear lamp is separately provided with lenses and a housing and an optical system is disposed in the housing. As described above, the rear lamp consists of separate components, and is mounted at a body portion separately from a rear glass and thus requires a predetermined cavity. In particular, a specific image is implemented using a hologram through the rear lamp, however, beams are incident at an angle different from an angle at the time of recording of a hologram film and a distortion phenomenon of a reproduced image occurs.

The contents described as the related art have been provided merely for assisting in the understanding for the background of the present disclosure and should not be considered as corresponding to the related art known to those skilled in the art.

SUMMARY

The present disclosure provides a rear lamp apparatus of a vehicle capable of solving occurrence of distortion when forming a hologram image and being advantageous in a layout by decreasing a reproduction distance even though a recording distance of the hologram image is increased may be provided.

In an aspect of an exemplary embodiment of the present disclosure, a rear lamp apparatus of a vehicle may include a light source configured to irradiate beams, a hologram lens configured to form a specific image when the beams irradiated from the light source are incident thereto, a reflector disposed to position the beams of the light source incident thereto and reflect the beams irradiated from the light source to transmit the beams to the hologram lens and a shield disposed between the light source and the hologram lens to block the beams irradiated from the light source to prevent the beams from being incident to the hologram lens.

In some exemplary embodiments, the light source, the shield, and the hologram lens may be sequentially disposed in a linear arrangement, and the reflector may be disposed above or below the linear arrangement and be formed to transmit the beams to the hologram lens when reflecting the beams irradiated from the light source. The reflector may be formed in a parabolic shape having the linear arrangement as an axis and having an installation position of the light source as a focus. Accordingly, the beams irradiated from the light source may be transmitted in parallel with each other to the hologram lens when the beams are reflected. The reflector may be formed to transmit the beams at the same angle as a specific image recording angle of the hologram lens when the beams irradiated from the light source are reflected.

In other exemplary embodiments, the shield may be disposed to prevent interference with a path through which the beams irradiated from the light source may be reflected from a first end portion of the reflector and may then be incident to a first end portion of the hologram lens and a path through which the beams irradiated from the light source may be reflected from a second end portion of the reflector and may then be incident to a second end portion of the hologram lens. The second end portion of the shield may be disposed above a first beam path through which the beams irradiated from the light source may be reflected by the reflector and may then be transmitted to a first end portion of the hologram lens. The second end portion of the shield may be disposed below a second beam path through which the beams irradiated from the light source may be transmitted to the second end portion of the hologram lens.

The second end portion of the shield may be disposed above a third beam path through which the beams irradiated from the light source are reflected by the reflector and may then be transmitted to the second end portion of the hologram lens. The second end portion of the shield may be disposed in a virtual triangle area formed by a first beam path through which the beams irradiated from the light source are reflected by the reflector and may then be transmitted to a first end portion of the hologram lens. A second beam path through which the beams irradiated from the light source may be transmitted to the second end portion of the hologram lens. A third beam path through which the beams irradiated from the light source are reflected by the reflector and may then be transmitted to the second end portion of the hologram lens.

Additionally, the shield may have a blocking section to block the beams irradiated from the light source to prevent the beams from being incident to the hologram lens and a reflecting section bent from the blocking section and reflecting the beams reflected by the reflector to prevent the beams from being incident to the hologram lens. The reflector may have a first reflecting section configured to reflect the beams irradiated from the light source to be transmitted to the hologram lens and a second reflecting section reflecting the beams irradiated from the light source to be transmitted to the reflecting section.

An angle formed by the blocking section and the hologram lens and an angle formed by the reflecting section and the hologram lens may be less than an angle of beams irradiated from the light source and reflected by the reflector are incident to the hologram lens. The blocking sections and the reflecting sections of the shield may be extended to be repeated multiple times in a length auction. The reflecting section may form a background image based on a shape formed in an area of the shield of the reflecting section.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
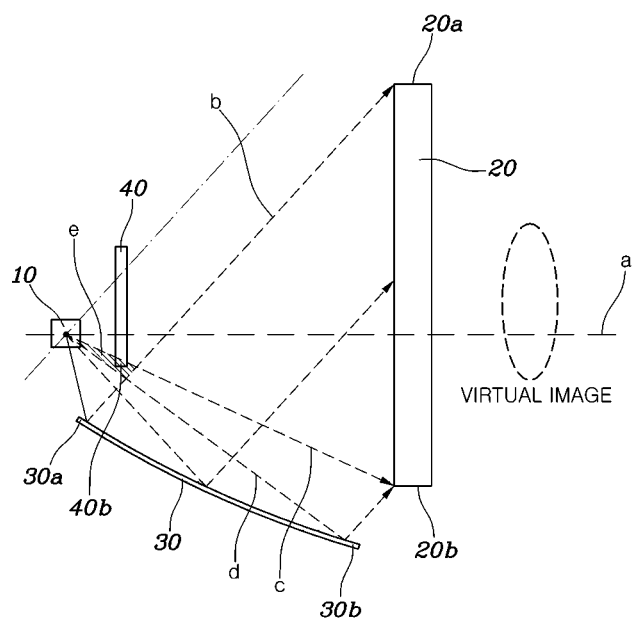
FIG. 1 is an exemplary view illustrating a rear lamp apparatus of a vehicle according to an exemplary embodiment of the present disclosure.
Figure 2:
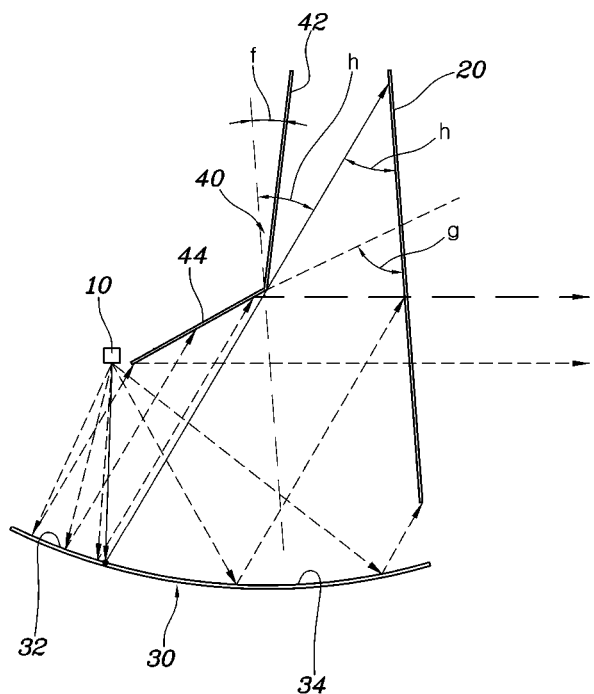
FIG. 2 is an exemplary view for describing an exemplary embodiment of the rear lamp apparatus of a vehicle illustrated in FIG. 1 according to an exemplary embodiment of the present disclosure.
Figure 7:
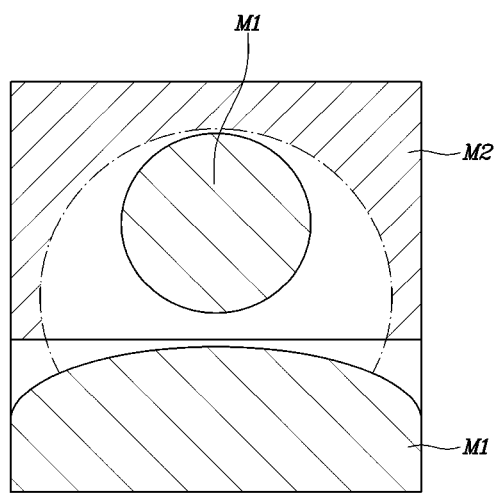
FIG. 7 is an exemplary view for describing an exemplary embodiment of the rear lamp apparatus of a vehicle illustrated in FIG. 1 according to an exemplary embodiment of the present disclosure.

Hereinafter, a rear lamp apparatus of a vehicle according to an exemplary embodiment of the present disclosure will be described with reference to the accompanying drawings. FIG. 1 is an exemplary view illustrating a rear lamp apparatus of a vehicle according to an exemplary embodiment of the present disclosure. FIGS. 2 and 7 are exemplary views for describing various exemplary embodiments of the rear lamp apparatus of a vehicle illustrated in FIG. 1.

The rear lamp apparatus of a vehicle according to the present disclosure may include a light source 10 configured to irradiate beams, a hologram lens 20 configured to generate a specific image when the beams irradiated from the light source 10 are incident thereto, a reflector 30 disposed to position the beams of the light source incident thereto and reflect the beams irradiated from the light source 10 to transmit the beams to the hologram lens 20 and a shield 40 disposed between the light source 10 and the hologram lens 20 to block the beams irradiated from the light source 10 to prevent the beams from being incident to the hologram lens 20, as illustrated in FIG. 1.

As described above, the rear lamp apparatus of a vehicle according to the present disclosure may include the light source 10, the hologram lens 20, the reflector 30, and the shield 40. In particular, the beams irradiated from the light source 10 may be reflected by the reflector 30 and may then be incident to the hologram lens 20, to generate the specific image through the hologram lens 20. However, when the beams irradiated from the light source 10 are incident to the hologram lens 20 without being reflected by the reflector 30, a distortion phenomenon of the specific image reproduced through the hologram lens 20 may occur. Accordingly, in the present disclosure, to solve such a problem, the shield 40 may be disposed between the light source 10 and the hologram lens 20 to block the beams irradiated from the light source 10 to prevent the beams from being directly incident to the hologram lens 20. Therefore, the beams irradiated from the light source 10 may be reflected by the reflector 30 and may then be incident to the hologram lens 20, to generate the specific image. The beams irradiated from the light source 10 and directly transmitted to the hologram lens 20 may be blocked by the shield 40, to resolve the distortion phenomenon of the specific image.

In particular, as illustrated in FIG. 1, the light source 10, the shield 40, and the hologram lens 20 may be sequentially disposed in a linear arrangement a, and the reflector 30 may be disposed above or below the linear arrangement a and may be formed to transmit the beams to the hologram lens 20 when reflecting the beams irradiated from the light source 10. Since the light source 10, the shield 40, and the hologram lens 20 are disposed in a linear arrangement a as described above, the beams irradiated from the light source 10 may be blocked by the shield 40, to prevent the beams from being incident to the hologram lens 20, and the beams reflected by the reflector 30 disposed above or below the linear arrangement among the beams irradiated from the light source 10 may be incident to the hologram lens 20. In the drawings of the present disclosure, when the reflector 30 is disposed below the linear arrangement a is illustrated, and the light source 10, the hologram lens 20, the reflector 30, and the shield 40 may be disposed in a lamp housing.

For example, the reflector 30 may be formed to transmit the beams to the hologram lens 20 when reflecting the beams irradiated from the light source 10. The reflector 30 may be formed in a parabolic shape having the linear arrangement a as an axis and having an installation position of the light source 10 as a focus. Accordingly, the beams irradiated from the light source 10 may be transmitted in parallel with each other to the hologram lens 20 when the beams are reflected.

As described above, the reflector 30 may be formed in the parabolic shape and may be formed in the parabolic shape having the linear arrangement a as the axis and having the installation position of the light source 10 as the focus. Accordingly, the beams irradiated from the light source 10 may be reflected by the reflector 30 and be then incident in parallel with each other to the hologram lens 20. In other words, the reflector 30 may be formed to transmit the beams at the same angle as a specific image recording angle of the hologram lens 20 when reflecting the beams irradiated from the light source 10, and the beams reflected by the reflector 30 may be transmitted in parallel with each other to the hologram lens 20 to be thus transmitted at the same angle as an incidence angle of the beams when recording the image.

For reference, a principle of recording a hologram image M1 on the hologram lens 20 will be described. When reference beams are irradiated from an opposite side to a subject toward the subject at a predetermined angle with the hologram lens 20 interposed therebetween, an image may be recorded on the hologram lens 20 by the reference beams, and object beams colliding with and diffusely reflected by the subject may also be recorded on the hologram lens 20. In particular, the reference beams and the object beams may generate an interference phenomenon on the hologram lens 20 to create an interference pattern. The interference pattern created as described above may become the recorded hologram image M1 implemented by the hologram lens 20. Therefore, when an angle of the beams incident to the hologram lens 20 are made to be the same as an incidence angle of the reference beams, the recorded hologram image M1 may be reproduced when the beams are incident to the hologram lens 20.

The incident angle of the beams when reproducing the hologram image M1 through the hologram lens 20 may be the same as that of the beams when recording the hologram image M1. The beams irradiated from the light source 10 may be reflected by the reflector 30 and may then be transmitted along changed paths. Accordingly, even though a distance at the time of recording the hologram image M1 may be increased, a reproduction distance may be reduced. In addition, the reflector 30 may have the parabolic shape to reflect the beams irradiated from the light source 10 to be transmitted in parallel with each other toward the hologram lens 20, thereby making it possible to more accurately implement the hologram image M1 reproduced by the hologram lens 20.

The shield 40 may be disposed to prevent interference with a path through which the beams irradiated from the light source 10 are reflected from a first end portion 30a of the reflector 30 and are then incident to a first end portion 20a of the hologram lens 20 and a path through which the beams irradiated from the light source 10 may be incident to the second end portion 30b of the reflector 30. In addition, the shield 40 may be formed to correspond to a shape of the hologram lens 20, and may prevent the beams irradiated from the light source 10 from being directly incident to the hologram lens 20.

Therefore, the beams irradiated from the light source 10 may be reflected by the reflector 30 and may be then incident to the hologram lens 20. Them beams transmitted from the light source 10 to the hologram lens 20 may be blocked by the shield 40. For example, the shield 40 may be disposed to prevent interference with the path through which the beams irradiated from the light source 10 may be reflected from a first end portion 30a of the reflector 30 and may then be incident to a first end portion 20a of the hologram lens 20 and the path through which the beams irradiated from the light source 10 may be incident to the second end portion 30b of the reflector 30, thereby making it possible to allow the beams to be reflected by the reflector 30 and be then incident up to the plurality of end portions of the hologram lens 20. Therefore, even when the shield 40 is disposed, the beams irradiated from the light source 10 may be reflected by the reflector 30 and may then be incident to the surface of the hologram lens 20, to more accurately implement the image reproduced by the hologram lens 20.

In particular, the second end portion 40b of the shield 40 may be disposed above a first beam path b through which the beams irradiated from the light source 10 are reflected by the reflector 30 and are then transmitted to a first end portion 20a of the hologram lens 20. In addition, the second end portion 40b of the shield 40 may be disposed below a second beam path c through which the beams irradiated from the light source 10 are transmitted to the second end portion of the hologram lens 20.

Additionally, the second end portion 40b of the shield 40 may be disposed above a third beam path d through which the beams irradiated from the light source 10 are reflected by the reflector 30 and are then transmitted to the second end portion 20b of the hologram lens 20. When the second end portion 40b of the shield 40 is disposed below the first beam path b, the shield may interfere with a path through which the beams irradiated from the light source 10 are reflected by the reflector 20 and are then transmitted to the hologram lens 20 and the image may not be accurately implemented through the hologram lens 20.

When the second end portion 40b of the shield 40 is disposed above the second beam path c, the beams irradiated from the light source 10 may be incident to the hologram lens 20 and may distort the image created through the hologram lens 20. When the second end portion 40b of the shield 40 is disposed below the third beam path d, the beams irradiated from the light source 10 may be subjected to interference with the shield 40 and may not be incident to a reflecting surface. Accordingly, the image may not be accurately implemented through the hologram lens 20.

Therefore, as illustrated in FIG. 1, the second end portion 40b of the shield 40 may be disposed in a virtual triangle area e formed by the first beam path b through which the beams irradiated from the light source 10 may be reflected by the reflector 30 and may then be transmitted to a first end portion 20a of the hologram lens 20. The second beam path c through which the beams irradiated from the light source 10 may be transmitted to the second end portion 20b of the hologram lens 20. The third beam path d through which the beams irradiated from the light source 10 are reflected by the reflector 30 and may then be transmitted to the second end portion 20b of the hologram lens 20.

As described above, the second end portion 40b of the shield 40 may be disposed in the virtual triangle area e, to reflect the beams irradiated from the light source 10 by the reflector 30 and may be incident to the surface of the hologram lens 20 during transmission t to the hologram lens 20. The beams irradiated from the light source 10 may be prevented from being incident to the hologram lens 20 to enable the image to be more accurately implemented through the hologram lens 20 without being distorted. The shield 40 described above may be formed in the shape that corresponds to the hologram lens 20, and when the hologram lens 20 is formed to have a plane the shield 40 may also be formed to have a plane. The shield 40 having a plane shape may be an exemplary embodiment.

Further, as another exemplary embodiment of the shield 40, as illustrated in FIG. 2, the shield 40 may have a blocking section 42 that blocks the beams irradiated from the light source 10 to prevent the beams from being incident to the hologram lens 20 and a reflecting section 44 bent from the blocking section 42 and reflect the beams reflected by the reflector 30 to be incident to the hologram lens 20. As described above, the shield 40 may have the blocking section 42 and the reflecting section 44 to limit the beams irradiated from the light source 10 from being incident to the hologram lens 20 and reflect the beams reflected by the reflector 30 and then may be transmitted toward the hologram lens 20, thereby forming a background image M2 together with the hologram image M1. Therefore, the shield 40 may be formed of a material that may reflect the beams, the blocking section 42 may be disposed at an angle that reflect the beams by the reflector 30 and then transmitted are not incident to an end surface thereof, and the reflecting section 44 may be bent to enable the beams reflected by the reflector 30 and then transmitted are incident to an end surface thereof and are then transmitted to the hologram lens 20.

Therefore, as illustrated in FIG. 2, the beams irradiated from the light source 10 may be reflected by the reflector 30 and may then be transmitted to the hologram lens 20, to generate a specific image through the hologram lens 20, and some of the beams of the light source 10 may be reflected by the reflector 20, are again reflected by the reflecting section 44, and may then be transmitted toward the hologram lens 20 to generate the background image M2. For example, an angle f formed by the blocking section 42 and the hologram lens 20 and an angle g formed by the reflecting section 44 and the hologram lens 20 may be less than an angle h at which the beams irradiated from the light source 10 and reflected by the reflector 30 are incident to the hologram lens 20.

In particular, the angle f formed by the blocking section 42 and the hologram lens 20 may be greater than the angle h at which the beams irradiated from the light source 10 and reflected by the reflector 30 are incident to the hologram lens 20. The beams may be reflected through the blocking section 42 and may then be incident to the hologram lens 20 to form an unintended image. In addition, when the angle g formed by the reflecting section 44 and the hologram lens 20 is greater than the angle h at which the beams irradiated from the light source 10 and reflected by the reflector 30 are incident to the hologram lens 20, the beams may not be reflected by the reflecting section 44 or be reflected in a direction that is not an intended direction to have an influence on the hologram image M1. Therefore, the blocking section 42 and the reflecting section 44 may be formed at angles set based on an initially set image.

In addition, the reflector 30 may have a first reflecting section 32 configured to reflect the beams irradiated from the light source 10 to be transmitted to the hologram lens 20 and a second reflecting section 34 configured to reflect the beams irradiated from the light source 10 to be transmitted to the reflecting section 44.

As described above, the reflector 30 may include the first reflecting section 32 and the second reflecting section 34, and the first reflecting section 32 and the second reflecting section 34 may be extended integrally with each other to transmit the beams irradiated from the light source 10 to the hologram lens 10. For example, the first reflecting section 32 may be configured to reflect the beams irradiated from the light source 10 to transmit the beams to the hologram lens 20, to generate the specific image through the hologram lens 20. The second reflecting section 34 may be configured to reflect the beams irradiated from the light source 10 to transmit the beams to the reflecting section 44 of the shield 40 to generate the background image M2. The first reflecting section 32 and the second reflecting section 34 may be extended in the parabolic shape described above.

Figure 3:
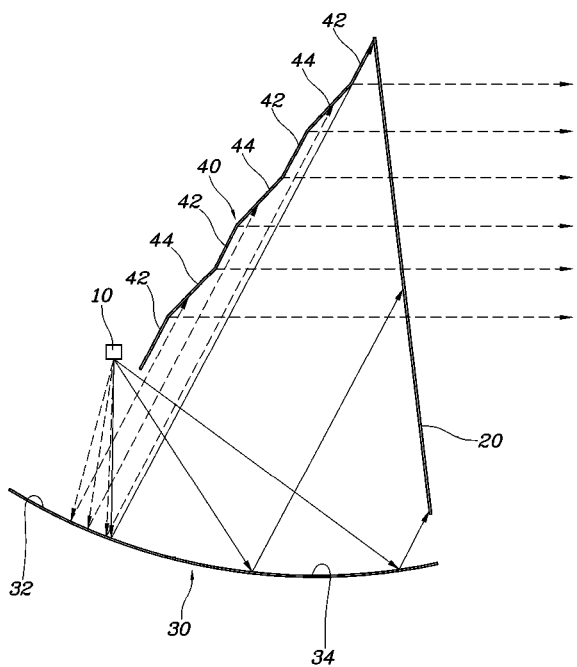
FIG. 3 is an exemplary view for describing an exemplary embodiment of the rear lamp apparatus of a vehicle illustrated in FIG. 1 according to an exemplary embodiment of the present disclosure.

In another exemplary embodiment, as illustrated in FIG. 3, the blocking sections 42 and the reflecting sections 44 of the shield 40 may be extended to be repeated multiple times in a length direction. As described above, since the blocking sections 42 and the reflecting sections 44 of the shield 40 are extended to be repeated, when the beams irradiated from the light source 10 are reflected by the reflector 30 and are then incident to the hologram lens 20, a specific image may be generated through the hologram lens 20. When the beams irradiated from the light source 10 are reflected by the reflector 30 and are again reflected by the reflecting sections 44 of the shield 40 and are then incident to the hologram lens 20, a background image M2 may be generated around the specific image.

Figure 4:
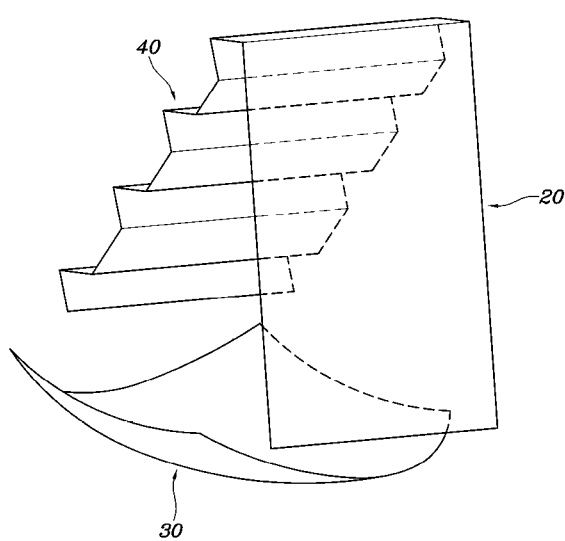
FIG. 4 is an exemplary view for describing an exemplary embodiment of the rear lamp apparatus of a vehicle illustrated in FIG. 1 according to an exemplary embodiment of the present disclosure.
Figure 5:
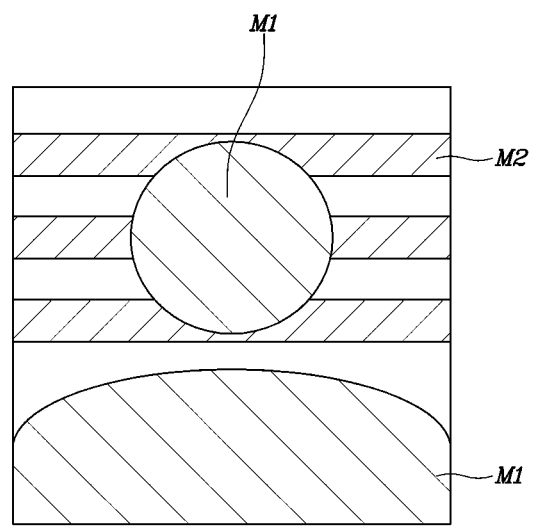
FIG. 5 is an exemplary view for describing an exemplary embodiment of the rear lamp apparatus of a vehicle illustrated in FIG. 1 according to an exemplary embodiment of the present disclosure.

In other words, a hologram image M1 implemented by the exemplary embodiment of the shield 40 illustrated in FIG. 3 may be formed together with the background image M2 formed by the reflecting sections 44 of the shield 40, as illustrated in FIG. 5. In a shape of the shield 40 for implementing a background image M2, as illustrated in FIG. 4, forms of the blocking sections 42 and the reflecting sections 44 may be variously formed. Additionally, background images M2 may have various shapes formed based on widths and forms of the blocking sections 42 and the reflecting sections 44.

Figure 6:
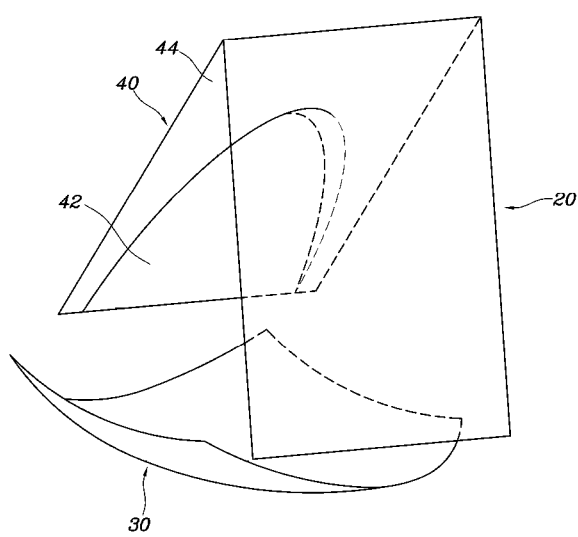
FIG. 6 is an exemplary view for describing an exemplary embodiment of the rear lamp apparatus of a vehicle illustrated in FIG. 1 according to an exemplary embodiment of the present disclosure.

As still another exemplary embodiment, the reflecting section 40 may form a background image M2 based on a shape formed in an area of the shield 40. As an example, as illustrated in FIG. 6, the reflecting section 44 may be formed in a semicircular shape. A hologram image M1 formed through the reflecting section 44 in the semicircular shape may be formed together with a background image M2 having a semicircular shape as illustrated in FIG. 7. The background image M2 is not limited to being created in one shape, but may be created in various shapes based on the shape of the reflecting section 44 in the area of the shield 40. The rear lamp apparatus of a vehicle having the structure as described above solves occurrence of distortion at the time of creating the hologram image M1 and may be advantageous in a layout by making a reproduction distance short even though a recording distance of the hologram image M1 may be increased.

Although the present disclosure has been shown and described with respect to exemplary embodiments, it will be obvious to those skilled in the art that the present disclosure may be variously modified and altered without departing from the spirit and scope of the present disclosure as defined by the following claims.

What is claimed is:

1. A rear lamp apparatus of a vehicle, comprising:
   a light source configured to irradiate beams;
   a hologram lens configured to generate a specific image when the beams irradiated from the light source are incident thereto;
   a reflector disposed to position the beams of the light source incident thereto and configured to reflect the beams irradiated from the light source to transmit the beams to the hologram lens; and
   a shield disposed between the light source and the hologram lens to block the beams irradiated from the light source to prevent the beams from being be incident to the hologram lens,
   wherein the light source, the shield, and the hologram lens are disposed sequentially in a linear arrangement, and the reflector is disposed above or below the linear arrangement and is formed to transmit the beams to the hologram lens when the beams irradiated from the light source are reflected, and wherein the reflector is formed to transmit the beams at the same angle as a specific image recording angle of the hologram lens when the beams irradiated from the light source are reflected.

2. The rear lamp apparatus of a vehicle of claim 1, wherein the reflector is formed in a parabolic shape having the linear arrangement as an axis and having an installation position of the light source as a focus, and wherein the beams irradiated from the light source are transmitted in parallel with each other to the hologram lens when the beams are reflected.

3. A rear lamp apparatus of a vehicle, comprising:
a light source configured to irradiate beams;
a hologram lens configured to generate a specific image when the beams irradiated from the light source are incident thereto;
a reflector disposed to position the beams of the light source incident thereto and configured to reflect the beams irradiated from the light source to transmit the beams to the holograms lens; and
a shield disposed between the light source and the hologram lens to block the beams irradiated from the light source to prevent the beams from being be incident to the hologram lens,
wherein the shield is disposed to prevent interference with a path through which the beams irradiated from the light source are reflected from a first end portion of the reflector and are then incident to a first end portion of the hologram lens and a path through which the beams irradiated from the light source are reflected from a second end portion of the reflector and are then incident to a second end portion of the hologram lens.

4. The rear lamp apparatus of a vehicle of claim 1, wherein the second end portion of the shield is disposed above a first beam path through which the beams irradiated from the light source are reflected by the reflector and are then transmitted to the first end portion of the hologram lens.

5. The rear lamp apparatus of a vehicle of claim 1, wherein the second end portion of the shield is disposed below a second beam path through which the beams irradiated from the light source are directly transmitted to the second end portion of the hologram lens.

6. The rear lamp apparatus of a vehicle of claim 1, wherein the second end portion of the shield is disposed above a third beam path through which the beams irradiated from the light source are reflected by the reflector and are then transmitted to the second end portion of the hologram lens.

7. The rear lamp apparatus of a vehicle of claim 1, wherein the second end portion of the shield is disposed in a virtual triangle area formed by a first beam path through which the beams irradiated from the light source are reflected by the reflector and are then transmitted to a first end portion of the hologram lens, a second beam path through which the beams irradiated from the light source are directly transmitted to the second end portion of the hologram lens, and a third beam path through which the beams irradiated from the light source are reflected by the reflector and are then transmitted to the second end portion of the hologram lens.

8. The rear lamp apparatus of a vehicle of claim 1, wherein the shield has a blocking section that blocks the beams irradiated from the light source to prevent the beams from being directly incident to the hologram lens and a reflecting section bent from the blocking section and configured to reflect the beams reflected by the reflector to be incident to the hologram lens.

9. The rear lamp apparatus of a vehicle of claim 8, wherein the reflector has a first reflecting section configured to reflect the beams irradiated from the light source to be transmitted to the hologram lens and a second reflecting section configured to reflect the beams irradiated from the light source to be transmitted to the reflecting section.

10. The rear lamp apparatus of a vehicle of claim 8, wherein an angle formed by the blocking section and the hologram lens and an angle formed by the reflecting section and the hologram lens are less than an angle at which the beams irradiated from the light source and reflected by the reflector are incident to the hologram lens.

11. The rear lamp apparatus of a vehicle of claim 8, wherein the blocking sections and the reflecting sections of the shield are extended to be repeated multiple times in a length direction.

12. The rear lamp apparatus of a vehicle of claim 8, wherein the reflecting section forms a background image based on a shape that forms the reflecting section in an area of the shield.

* * * * *